(12) United States Patent
Dillon et al.

(10) Patent No.: US 9,258,608 B2
(45) Date of Patent: Feb. 9, 2016

(54) SYSTEM AND METHOD FOR MANAGING ENTITLEMENTS TO DATA OVER A NETWORK

(71) Applicants: Michael Dillon, Aldie, VA (US); Peter Stern, Riverside, CT (US); Jon Putsch, Westminster, CO (US); Matthew Meyers, Westport, CT (US)

(72) Inventors: Michael Dillon, Aldie, VA (US); Peter Stern, Riverside, CT (US); Jon Putsch, Westminster, CO (US); Matthew Meyers, Westport, CT (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 479 days.

(21) Appl. No.: 13/721,154

(22) Filed: Dec. 20, 2012

(65) Prior Publication Data
US 2013/0111517 A1 May 2, 2013

Related U.S. Application Data

(63) Continuation of application No. 12/536,724, filed on Aug. 6, 2009, now Pat. No. 8,341,242.

(60) Provisional application No. 61/117,248, filed on Nov. 24, 2008, provisional application No. 61/117,265, filed on Nov. 24, 2008.

(51) Int. Cl.
H04N 21/45 (2011.01)
G06F 21/10 (2013.01)
(Continued)

(52) U.S. Cl.
CPC ............ *H04N 21/4508* (2013.01); *G06F 21/10* (2013.01); *H04N 7/1675* (2013.01);
(Continued)

(58) Field of Classification Search
CPC ...................................................... H04N 21/45
USPC ............................................................ 709/229
See application file for complete search history.

(56) References Cited

U.S. PATENT DOCUMENTS

2007/0067851 A1 3/2007 Fernando et al.
2007/0219910 A1* 9/2007 Martinez ......................... 705/51
(Continued)

OTHER PUBLICATIONS

International Search Report and Written Opinion, Intl. Application No. PCT/US2010/044756, International Searching Authority, European Patent Office (ISA/EP), mailed Oct. 22, 2010.
(Continued)

*Primary Examiner* — Vivek Srivastava
*Assistant Examiner* — Sibte Bukhari
(74) *Attorney, Agent, or Firm* — The Marbury Law Group, PLLC

(57) ABSTRACT

A system and method for determining entitlement to content residing on a server. A subscriber account with a multi-channel video program distributor (MVPD) includes subscription information indicative of the services provided by the MVPD to the subscriber. A computing device operated by the subscriber sends a request for access to content controlled by the MVPD. The request is received by the MVPD and forwarded to an entitlements server. The entitlement server sends an access granted message to the MVPD when the subscriber is entitled to receive the requested content. The IP address of the subscriber computing device is used to determine whether the computing device is connected to the network via a network access device authorized by the MVPD. The "on-net" or "off-net" status of the computing device may be used to determine whether the subscriber receives the requested content and/or a quality of service level applied to the content.

18 Claims, 9 Drawing Sheets

(51) Int. Cl.
 *H04N 7/167* (2011.01)
 *H04N 21/254* (2011.01)
 *H04N 21/266* (2011.01)
 *H04N 21/6334* (2011.01)
 *H04N 21/643* (2011.01)
 *H04N 21/658* (2011.01)

(52) U.S. Cl.
 CPC ..... *H04N21/2541* (2013.01); *H04N 21/26606* (2013.01); *H04N 21/6334* (2013.01); *H04N 21/64322* (2013.01); *H04N 21/6581* (2013.01)

(56) References Cited

U.S. PATENT DOCUMENTS

2008/0091805 A1\* 4/2008 Malaby et al. ................ 709/223
2008/0133551 A1 6/2008 Wensley et al.
2008/0282299 A1 11/2008 Koat et al.

OTHER PUBLICATIONS

International Preliminary Report on Patentability (Chapter 1 of the Patent Cooperation Treaty), Int. Application No. PCT/US2010/044756 mailed Feb. 16, 2012.

\* cited by examiner

SYSTEM AND METHOD FOR MANAGING ENTITLEMENTS TO DATA OVER A NETWORK

CROSS REFERENCE TO RELATED APPLICATIONS

This application is a continuation application of application Ser. No. 12/536,724 filed Aug. 6, 2009, to be issued on Dec. 25, 2012 as U.S. Pat. No. 8,341,242, which application claims priority under 35 U.S.C. §119(e) from provisional application No. 61/117,248 filed Nov. 24, 2008 and from provisional application No. 61/117,265 filed Nov. 24, 2008. The U.S. Pat. No. 8,341,242, the application Ser. No. 12/536, 724 and the 61/117,248 and the 61/117,265 provisional applications are incorporated by reference herein, in their entireties, for all purposes.

BACKGROUND

Data in the form of graphics, text, video, and audio (collectively, "content") is provided to subscribers over shared access networks. The data may be stored and retrieved as a file or it may be provided as a video stream. For example video programming and live programming are typically provided as a video stream. Cable, satellite and fiber networks are examples of shared networks that are used to deliver content.

Shared networks may be operated by multi-channel video programming distributors (MVPDs) provided to subscribers for a fee. Typically, the MVPDs obtain content from programmers. Content may be classified in tiers, as for example, basic, standard and premium. The subscriber subscribes to a service package with a tier and receives the content associated with that tier. The subscriber may be allowed to add "premium" channels to a particular tier.

The Internet is another potential delivery mechanism of data, particularly content provided as video stream. A subscriber who obtains content from a particular programmer from an MVPD may desire to obtain content of the programmer via the Internet. This access may be provided via a web server operated by a content access provider (CAP). For example, the CAP may be the content provider, a third party who has acquired rights from a content provider, or the MVPD. Access to content via the Internet represents an additional revenue opportunity to MVPD and content providers.

A subscriber who is entitled to access content over a shared network based on an existing relationship with an MVPD is not necessarily entitled to access the same or similar content from a CAP. At least one impediment to leveraging the MVPD relationship to obtain access to content provided by a CAP is the need to share subscriber information between the MVPD and the various CAPs. Subscriber information held by an MVPD is a valuable asset of the MVPD. Subscribers also consider such information as private. Thus, sharing of subscriber information held by MVPDs represents a significant deterrent to providing access to Web-based content based on a subscriber's relationship with a MVPD.

SUMMARY

Various embodiments provide methods and systems for determining whether a subscriber is entitled to access content via an IP network based on the subscriber's entitlement to receive the same content, related content or other content from a multi-channel video programming distributor without disclosing proprietary subscriber information.

DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the various embodiments.

DETAILED DESCRIPTION

Various embodiments provide methods and systems for determining whether a subscriber is entitled to access content from a content access provider (CAP) via an IP network based on the subscriber's entitlement to receive the same content, related content or other content from a multi-channel video programming distributor (MVPD) and for establishing a trust relationship between the CAP and MVPD.

As used herein, the term "content" encompasses video content, audio content, photographic content, text content, game content, and multi-media content. Content is sometimes collectively referred to as a "resource."

As used herein, the term "computing device" encompasses, for example, desktop computers, laptop computers and mobile devices and other processor-equipped devices that may be developed in the future that may be configured to permit a user to interact with other devices over a network. As used herein, a "mobile device" encompasses cellular telephones, personal data assistants (PDA), and smart telephones.

As used herein, a "server" is a computing device that may be configured to interact in an automated fashion with other devices over a network to serve content and web pages, to issue responses to communications from other network devices and to respond to queries from other network devices.

As previously described, certain content provided by a content access provider (CAP) may be provided only to subscribers who are "entitled" to receive it. "Entitled" in this context means that a subscriber has established a relationship with a multi-channel video programming distributor (MVPD) and that relationship entitles the subscriber to access designated content provided by the CAP. Various processes that may allow the MVPD to determine whether the subscriber is entitled to access the designated content may be identified herein as "entitlement" processes or determinations. In some circumstances (described in detail below), a subscriber may be entitled to receive content generally but may not be authorized to receive requested content at a particular time. Unless otherwise clear from the context in which the term is used, "entitled" encompasses "authorized." Content should only be provided to a subscriber whose identity has been authenticated to an identity server. Various processes that confirm the identity of a subscriber may be identified herein as "authentication" or "identification" processes or determinations.

As used herein, "access to content," encompasses viewing content, receiving content, downloading content, and acquiring content.

Figure 1:
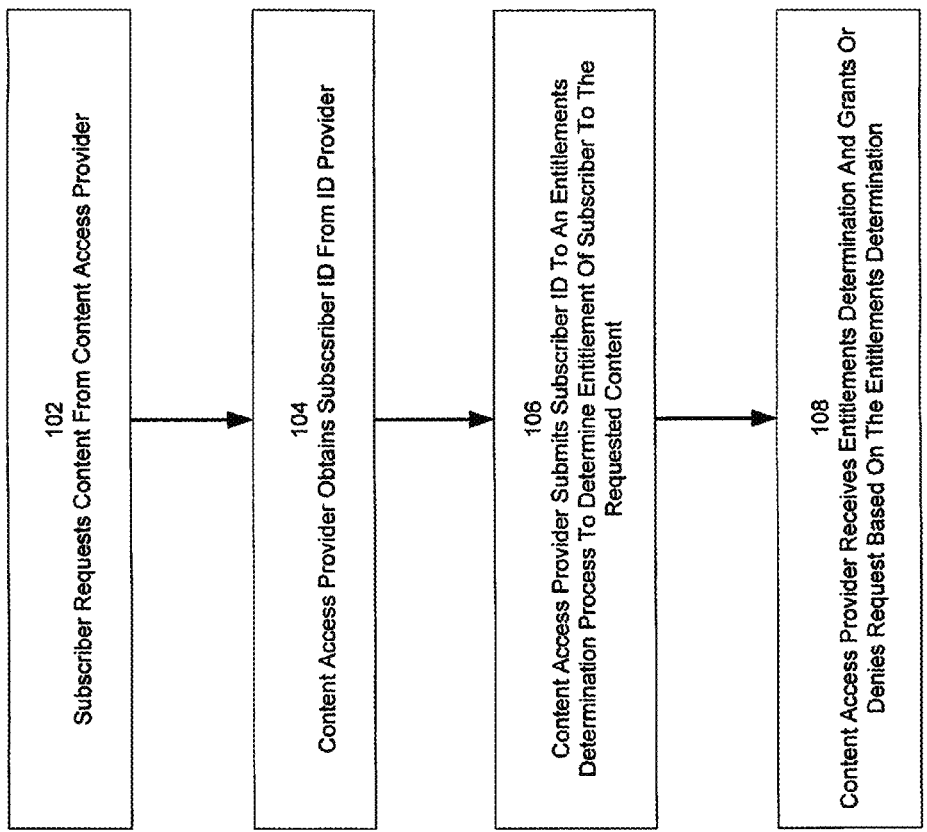
FIG. 1 is a flow diagram illustrating a process by which a subscriber's entitlement may be determined.

FIG. 1 is a flow diagram illustrating a process by which a subscriber's entitlement to view particular content may be determined.

At block 102 subscriber requests a target resource from a content access provider (CAP). For example, the CAP may be the content provider, a third party who has acquired rights from a content provider, or the MVPD.

In an embodiment, the subscriber accesses the CAP via the Internet. In this embodiment, a subscriber that is entitled and authorized to receive content from the CAP may do so anywhere that an Internet connection is available.

At block 104, the CAP obtains a subscriber identifier (ID) from an identity provider to authenticate the subscriber. In an embodiment, the ID provider is the MVPD. In another embodiment, the identity provider is a trusted third party.

The CAP and identity provider may independently establish a relationship with the subscriber. In an embodiment, when both the CAP and the identity provider have established relationships with the subscriber, a subscriber identity maintained by the identity provider and a subscriber identity maintain by the CAP may be linked using an identifier that does not reveal information about the subscriber's relationship with either the CAP or the identity provider. The linking of the subscriber identities maintained by the identity provider and the CAP permits the CAP to authenticate the subscriber without redirection to the identity provider.

Alternatively, the CAP may rely on the identity provider to authenticate the subscriber. Optionally, when linking of identifiers is not used, an authentication is session based and is not persistent.

At block 106, the CAP submits the subscriber ID to an entitlement determination process to identify the resources that the subscriber is entitled and authorized to receive. In an embodiment, the entitlement determination process is provided by the MVPD.

At block 108, the CAP receives that entitlement determination and grants or denies the request for the target resource based on the entitlements determination.

Figure 2:
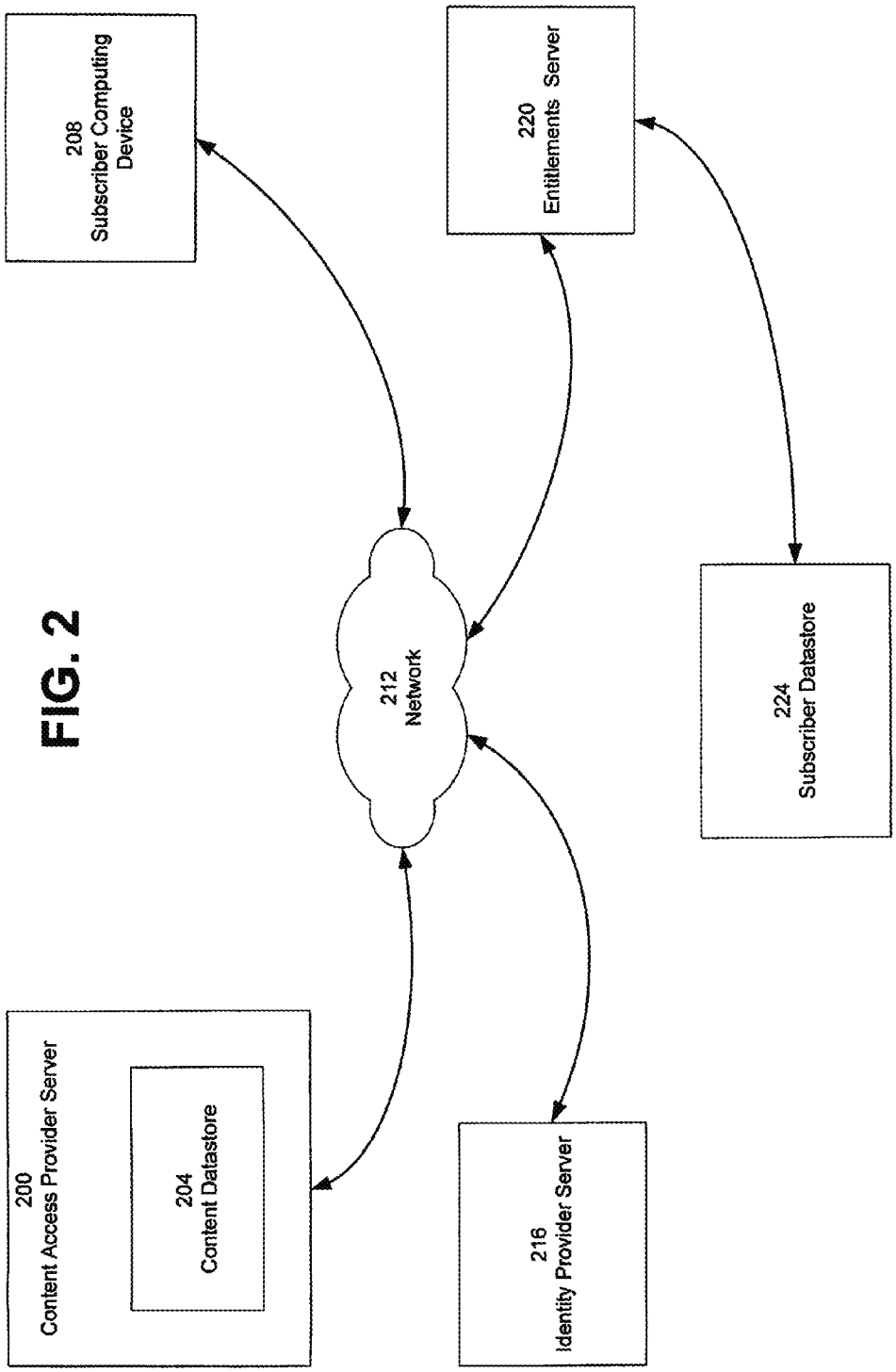
FIG. 2 is a block diagram illustrating networked components that may be used to determine a subscriber's entitlements according to an embodiment.

FIG. 2 is a block diagram illustrating the participants in the processes described in FIG. 1 according to an embodiment.

A CAP server 200 comprises a content datastore 204 that is accessible via a network 212. In an embodiment, the network 212 is the Internet. The content datastore 204 may reside in a memory of the CAP server 200 (see, FIG. 8) or it may be a separate data storage system that is accessible to the CAP server 200. The CAP server 200 may operate software applications to provide functionality to permit the CAP server 200 to communicate via the network 212 and to respond to communications from other devices connected to the network 212. These applications may be stored in a memory of the CAP server 200 (see, FIG. 8).

A subscriber computing device 208 may communicate with the CAP server 200 via the network 212 to request a target resource from the content datastore 204. The subscriber computing device 208 may operate software applications to provide functionality to permit the subscriber computing device 208 to communicate via the network 212 and to respond to communications from other devices connected to the network 212. By way of illustration and not as a limitation, subscriber computing device 208 may comprise a browser. These applications may be stored in a memory of the subscriber computing device 208 (see, FIGS. 6 and 7).

The CAP server 200 may communicate with the identity server 216 via the network 212 to acquire a subscriber identifier for the subscriber using the subscriber computing device 208. The identity server 216 may operate software applications to provide functionality to permit the CAP server 200 to communicate via the network 212 and to respond to communications from other devices connected to the network 212. These applications may be stored in a memory of the identity server 216 (see, FIG. 8).

In an embodiment, the subscriber computing device 208 may be redirected to the identity server 216 to allow the subscriber using the computing device 208 to provide authenticating information to the identity server 216.

The CAP server 200 may also communicate via the network 212 to provide the subscriber identifier to the entitlements server 220. In an embodiment, the entitlements server is under the control of the MVPD from which the subscriber receives services. The entitlements server 220 may operate software applications to provide functionality to permit the entitlements server 220 to communicate via the network 212 and to respond to communications from other devices connected to the network 212. These applications may be stored in a memory of the entitlements server 220 (see, FIG. 8). Additionally, the entitlements server 220 may operate software applications to provide functionality to permit the entitlements server 220 to interact with data storage devices and systems of the MVPD.

The entitlements server 220 may respond to the CAP server 200 with information regarding the entitlements of the subscriber. The entitlements server 220 may access subscription information in a subscriber datastore 224 to obtain sufficient information to determine the entitlements of the subscriber.

In an embodiment, the entitlements server 220 determines a subscriber's entitlement level for each content provider providing content to the MVPD based on information about the subscriber's subscription with the MVPD (subscription information). By way of illustration and not as a limitation, a subscriber who has paid to receive the content provider's content at a premium level (for example, full episodes, library content, outtakes and other extras) through an MVPD relationship (e.g., a subscription with a traditional cable or direct broadcast satellite provider) may be provided access to an enhanced, fully-loaded online experience from the content provider's web site. Thus, the relationship between the subscriber and the MVPD may permit the subscriber to access a video stream (stored or live broadcast) through an access point, such as a portal operated by the MVPD or the content provider. A subscriber who has not paid for the content provider's premium content through an MVPD relationship may be routed to the content provider's standard online experience (promotional content, limited number of full episodes, up-sell messages to subscribe to an MVPD video package).

Subscription information may include, but is not limited to subscriber tier, subscriber premium services, and subscription video-on-demand (SVOD) rights. By way of illustration, video tiers include BST, CPST, Digital, among others. Premium video services may include HBO, SHO, Starz, and SVOD rights may include movies on demand and access to pay per view events.

The CAP server 200 may use the entitlements information provided by the entitlements server 220 to determine whether to grant or deny the request for a target resource.

In another embodiment, the entitlements server 220 may track and reconcile any differences across divisions related to which networks are included in which tiers and packages. The entitlements server 220 also confirms that all broadcast network stations are consistently included in all video programming tiers, across all divisions and regions of the MVPD. The entitlements server 220 also confirms that those cable network stations are consistently included in all video programming tiers above BST across all divisions and regions of the MVPD. The entitlements server 220 further confirms that any bundled multiplex premium service entitlement subscriptions are included with their corresponding premium service entitlements. The entitlements server 220 additionally confirms that, where appropriate, all bundled SVOD subscriptions are included with their corresponding premium service entitlements.

In an embodiment, the subscriber identifier is written to the subscriber computing device 208 used by the subscriber to access the CAP server 200. In this embodiment, the subscriber identifier may remain active and available to the CAP server 200 on that subscriber's computing device 208 (by means of a cookie or other unobtrusive technology placed on subscriber's computing device 208 by the CAP server 200), so that future attempts to access the content from the CAP do not require customer log-in or re-registration (assuming cookie is still in place on subscriber's computing device).

In an embodiment, the entitlements server 220 provides the content provider either a positive or negative response to the question: "Is this subscriber entitled to view the CAP's content as part of his/her subscription service?" The entitlements server 220 may interface with various system of the MVPD to determine a subscriber's entitlement level for each content provider providing content to the MVPD. In this embodiment, the CAP server 200 writes the subscriber's entitlement status for its content to the subscriber's computing device (by means of a second cookie or other unobtrusive technology placed on subscriber's access device by the CAP server). In an embodiment, the entitlement status information is valid for a pre-determined time as agreed to by the CAP and the MVPD.

In an embodiment, the entitlement status (as stored on a cookie or other means used by the CAP) may be updated by the CAP's system without requiring the subscriber to log in or re-register.

In another embodiment, the entitlement status of a subscriber is determined using a message exchange that does not require cookies or other persistent information to be stored on the subscriber computing device 208.

In an embodiment, the CAP and the MVPD utilize a single sign on (SSO) solution that permits a subscriber to establish sessions with both parties by presenting credentials only once. The SSO solution may be implemented using linked identities where the CAP and MVPD each maintain separate identities for a subscriber. In an embodiment, the identities are linked in accordance with Security Assertion Markup Language (SAML) v2.0 standards promulgated by the Organization for the Advancement of Structured Information Standards ("OASIS").

In a non-linking environment, the CAP implements a federated model using SAML 2.0 to perform the authentication. When a subscriber attempts to access secure content from the CAP server 200, the CAP will make a request to the identity server 216 via the subscriber computing device 208. A response from the identity server 216 will contain the subscriber's identifier (GUID). The CAP will then make a request to the entitlements server 220 to obtain the entitlements for the subscriber.

In a linking environment, the CAP implements a federated model using SAML 2.0 to perform the authentication. When a subscriber attempts to access secure content from the CAP server 200, the CAP server 200 will make a request to the identity server 216 to check whether the subscriber has an authentication session. If needed the CAP will require login and check for an association to a MVPD and check the entitlement levels. If no association is present then the CAP will request that the subscriber link his or her CAP identity with the subscriber's MVPD identity. The response from the identity server 216 will contain the subscriber's ID (GUID) and a pseudonym for linking the identities. The CAP will then store the pseudonym along with the GUID for this subscriber in the persistent profile. The CAP will then make a request to the entitlements server 220 to obtain the entitlements for the subscriber using the GUID.

Figure 3A:
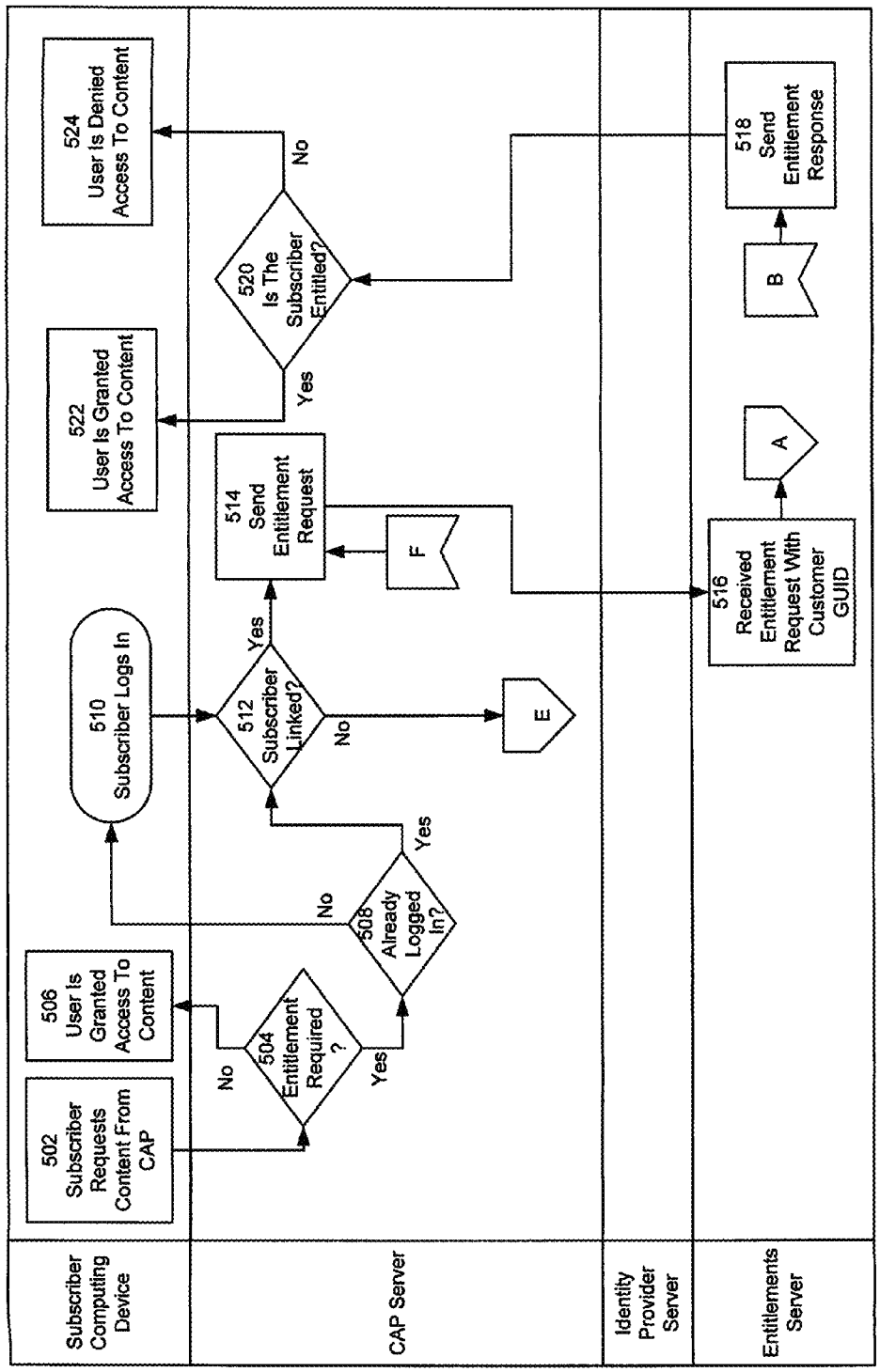
FIGS. 3A, B, C, and D are flow diagrams collectively illustrating a process by which the identity of a subscriber is provided to a content access provider using linking according to an embodiment.
Figure 3B:
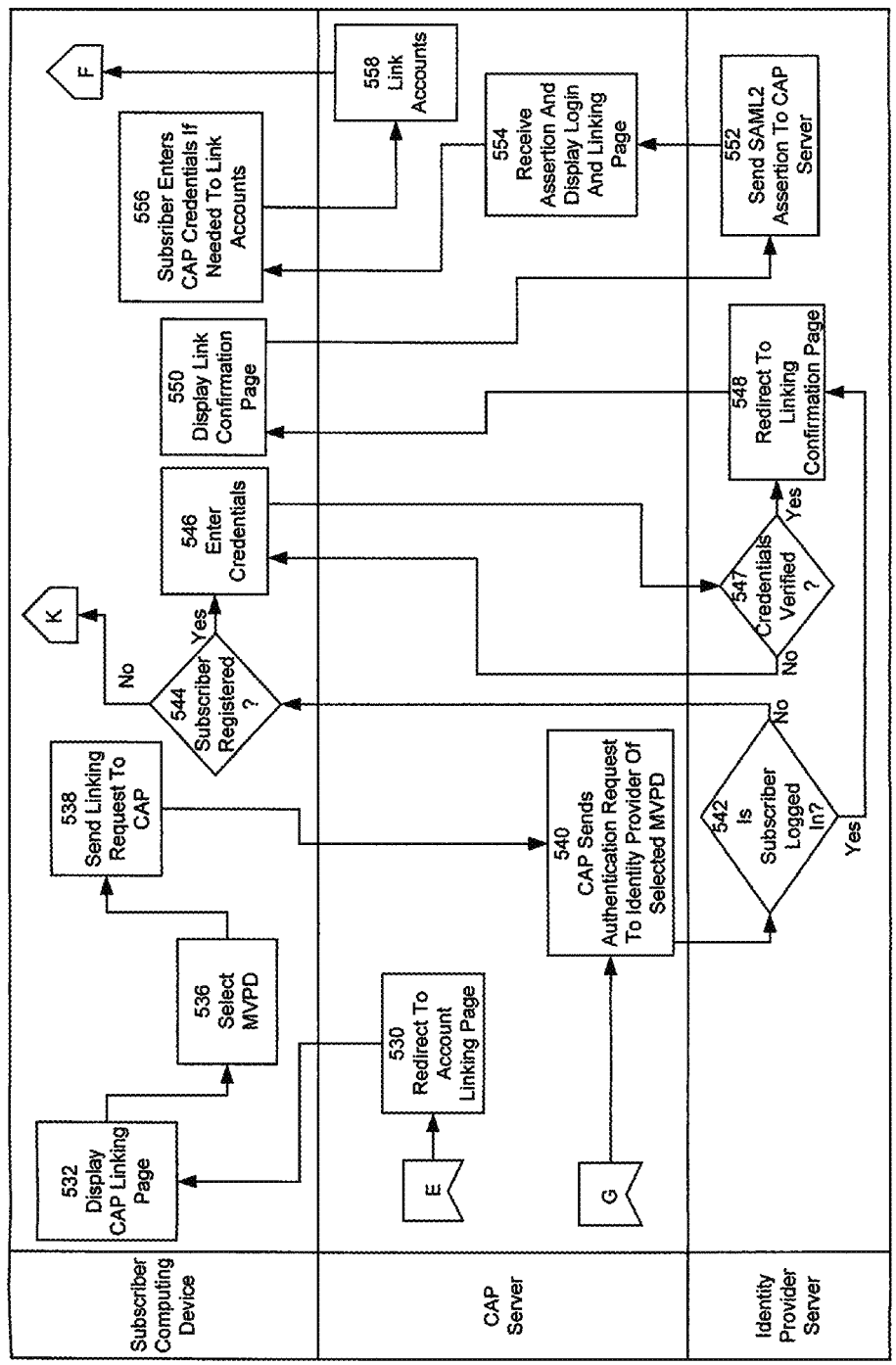
Figure 3C:
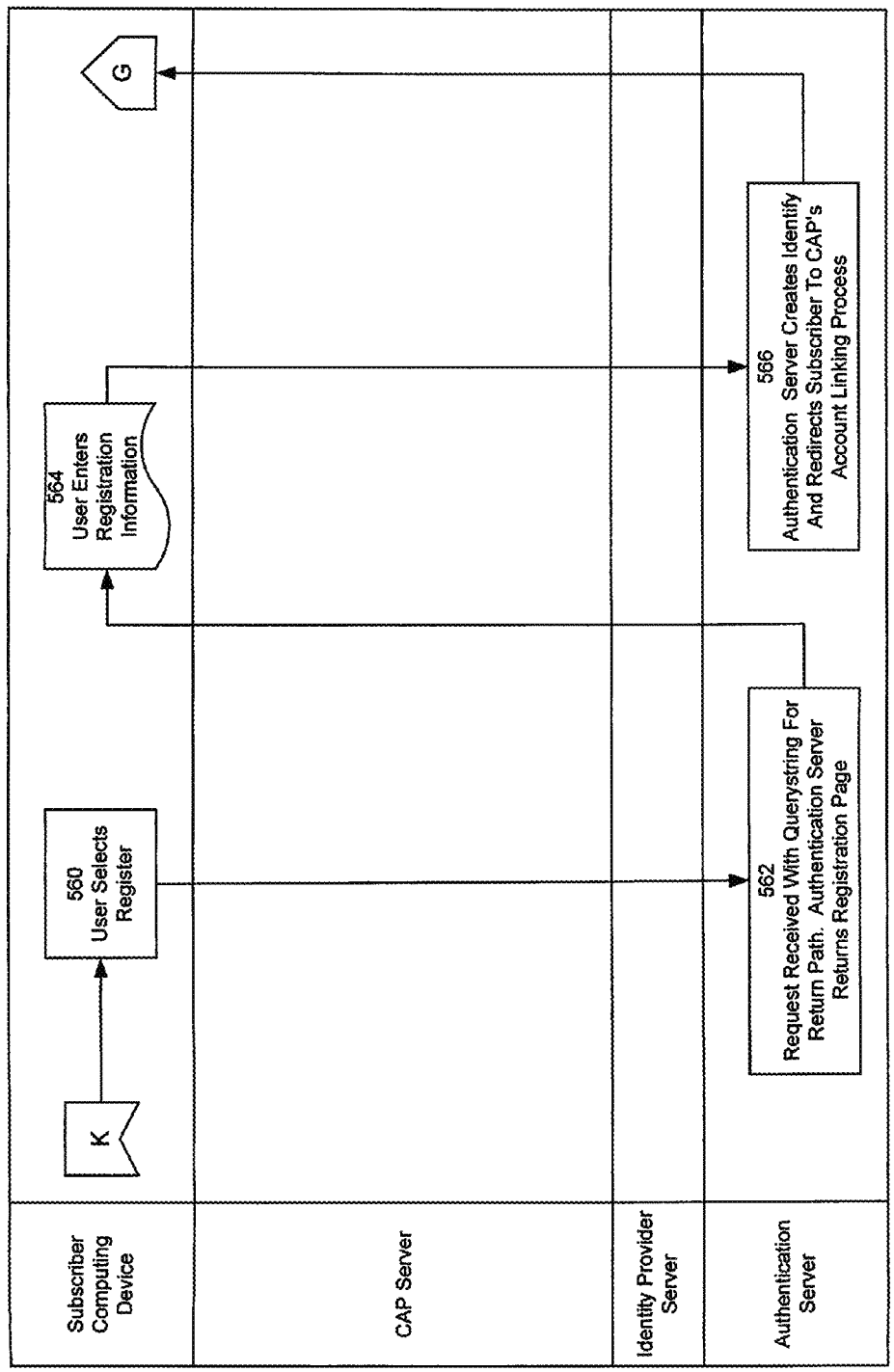
Figure 3D:
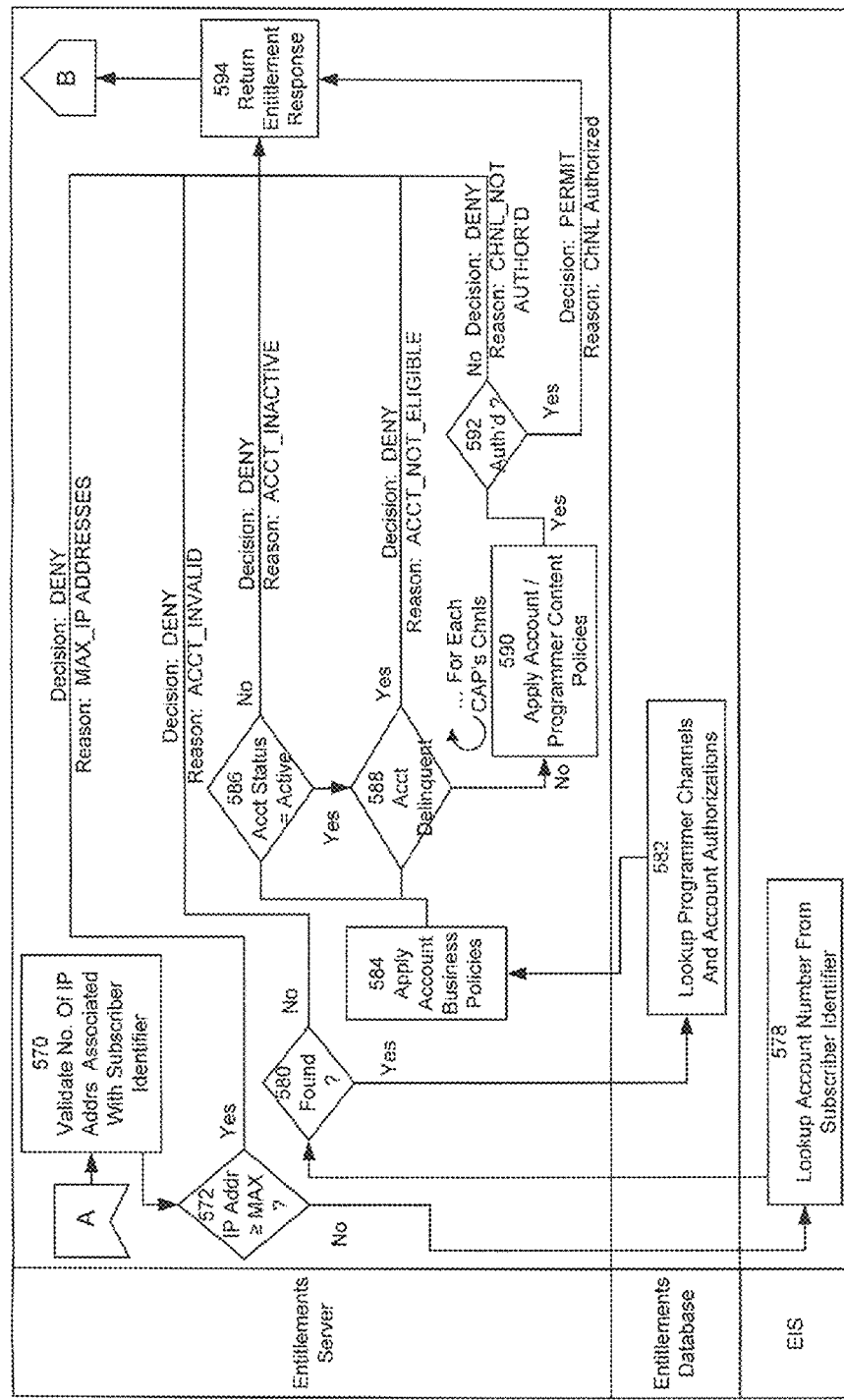

FIGS. 3A-D collectively illustrate a flow of an entitlement confirmation process according to embodiments. FIG. 3A illustrates the overall flow of the entitlements confirmation process while FIGS. 3C-3D illustrate additional processes that may be required to complete the entitlement confirmation process.

Referring to FIG. 3A, a subscriber requests content from a CAP (block 502). The CAP server determines whether the content requires that the subscriber be "entitled" to view the content (block 504). If entitlement is not required (i.e., if decision 504 is "No"), the subscriber is shown the requested content (block 506). If entitlement is required (i.e., if decision 504 is "Yes"), the CAP server determines whether the subscriber is already logged in to the CAP server domain (block 508). If the subscriber is not logged in to the CAP server domain (i.e., if decision 508 is "No"), the subscriber is authenticated to the CAP server by logging in (block 510) with credentials accepted by the CAP server. If the subscriber is logged in (i.e., if decision 508 is "Yes"), or after the subscriber logs in (block 510), the CAP server determines whether the subscriber has linked an identity between the subscriber and an MVPD and an identity between the subscriber and the CAP server (block 512).

If the subscriber is not linked (i.e., the decision 512 is "No"), the process branches to a linking process as indicated by reference "E." This linking process is described below in reference to FIG. 3B. If the subscriber is linked (i.e., the decision 512 is "Yes"), or after the linking process is completed and the identities are linked (indicated by return reference "F"), the CAP server sends an entitlement request to the entitlements server (block 514). In an embodiment, the entitlements request comprises an identifier associated with the subscriber that is known to the entitlements server and that links the identity between the subscriber and an MVPD and an identity between the subscriber and the CAP server. In this embodiment, the identifier may be distinct from an identifier assigned by the CAP server and an identifier assigned by the MVPD. By way of illustration and not by way of limitation, the identifier provided in the entitlements request may be a global unique Id (GUID). The entitlements request and the identifier are received by the entitlements server (block 516).

The process branches to an entitlement determination process as indicated by reference "A." This entitlements determination process is described below in reference to FIG. 3D. After the entitlements determination process is completed (indicated by return reference "B"), the entitlements server sends a response to the entitlements request to the CAP server (block 518).

The CAP server determines from the response whether the subscriber is entitled to access the requested content (block 520). If the subscriber is entitled to access the requested content (i.e., the decision 520 is "Yes"), the user is provided access to the content (block 522). If the subscriber is not entitled to access the requested content (i.e., the decision 520 is "No"), the user is denied access to the content (block 522).

As discussed above, the CAP server determines whether the subscriber has linked an identity between the subscriber and an MVPD and an identity between the subscriber and the CAP server (block 512). If the subscriber is not linked (i.e., the decision 512 is "No"), the process branches to a linking process as indicated by reference "E." Referring to FIG. 3B, a linking process commences with the CAP server redirecting the subscriber computing device to a linking page (block 530). The subscriber computing device displays a linking page from the CAP server (block 532). The page also queries the subscriber to select the subscribers MVPD (block 536). The subscriber computing device sends a linking request to the CAP server (block 538).

The CAP server receives the linking request and sends an authentication request to the identity provider server of the selected MVPD (block 540). In an embodiment, the identity provider of the selected MVPD is the MPVD. In another embodiment, the identity provider is a third party that provides identity services to the MVPD.

The identity provider server receives the authentication request and determines whether the subscriber is currently logged in to the identity provider domain (block 542). If the subscriber is not logged in (i.e., the decision 542 is "No"), the identity provider server queries the subscriber computing device to determine if the subscriber is currently registered with the identity provider (block 544). If the subscriber is not registered (i.e., the decision 544 is "No"), the process branches to a registration process as indicated by reference "K." If the subscriber is currently registered (i.e., the decision 544 is "Yes"), the subscriber computing device queries the subscriber for login credentials accepted by the identity provider (block 546).

The credentials are sent to the identity provider server for verification (block 547). If the subscriber credentials are not verified (i.e., the decision 547 is "No"), the identity provider server again queries the subscriber for the login credentials (block 546). If the subscriber credentials are verified (i.e., the decision 544 is "Yes"), or if the subscriber was currently logged in (i.e., the decision 542 is "Yes"), the identity provider server sends a redirect to the subscriber computing device (block 548).

The subscriber computing device displays the link confirmation page 550. The identity provider server sends a SAML2 assertion to the CAP server (block 552). The CAP server receives the assertion and redirects the subscriber computing device to a CAP login and linking page (block 554). The subscriber computing device receives the CAP credentials required to link the accounts and provides the linking credentials to the CAP server (block 556). The CAP server then links the accounts (block 558). The account linking process returns to the overall flow of the entitlements confirmation process illustrated in FIG. 3A as indicated by reference "F."

As discussed above, the identity provider server queries the subscriber computing device to determine if the subscriber is currently registered with the entitlements server (block 544). If the subscriber is not registered (i.e., the decision 544 is "No"), the process branches to a registration process as indicated by reference "K." Referring to FIG. 3C, a registration process commences with the subscriber computing device displaying a query whether the subscriber desires to register with the entitlements server (block 560). As previously described, a subscriber of a MVPD may have a subscriber identity with the MVPD. In addition, to use the entitlement confirmation process, the subscriber may require an identity that relates to the subscriber's identity with the MVPD but does not permit access to the subscriber's account or reveal information about the subscriber or the subscriber's account. By way of illustration and not by way of limitation, the identifier provided in the entitlements request may be a global unique Id (GUID).

To register the subscriber with the entitlements server, the subscriber computing device sends a registration request to an authentication server (block 560). The authentication server receives the registration request and returns a registration page to the subscriber computing device (block 562). The subscriber computing device receives the registration information from the subscriber and sends the information to an authentication server (block 564). The authentication server creates an identity for the subscriber and redirects the subscriber to the CAP's account linking process (block 566) as indicated by reference "G" (see, FIG. 3B). Referring to FIG. 3B, the CAP server sends an authentication request to the identity provider of the selected MVPD (block 540).

As discussed in reference to FIG. 3A, an entitlements request is forwarded from the CAP server to the entitlements server (block 516). In an embodiment, the entitlement request includes the IP address of the subscriber computing device from which the request originates. The process branches to an entitlements determination process as indicated by reference "A." Referring to FIG. 3D, the entitlements server may check the number of IP addresses associated with the subscriber identifier (block 570). The entitlements server determines whether the number of addresses associated with the subscriber at any one time is less than or equal to a maximum allowed number of simultaneous addresses (block 572). Setting a maximum number of IP addresses permits a CAP and/or the MVPD to allow sessions to be established by a subscriber from multiple locations. For example, a household may desire to simultaneously access different content from a CAP server from different locations (e.g., home, school, office, hot-spot, and vacation home). The household may be permitted up to a predetermined maximum number of simultaneous IP addresses to be associated with a subscriber identifier to manage capacity on the entitlements server and/or the CAP server and to prevent account abuse. In an embodiment, the maximum number of IP addresses allowed for a particular subscriber identifier may depend on the level of service that the subscriber has subscribed to or any other business rule the entitlements server imposes.

In an embodiment, the maximum allowed number of simultaneous unique IP addresses may be established over a period of time. For example, if in the last "X" hours there are more than "Y" entitlement requests for a particular subscriber identifier with unique IP addresses, the next request invoking the subscriber identifier may not be authorized.

In another embodiment, each time a subscriber logs into a CAP server and sends and makes a request for content that requires entitlement the CAP server forwards an entitlement request to the entitlements server. The entitlement server determines whether the subscriber is entitled to the requested content and whether the subscriber is authorized to receive it. If both of these determinations are decided in the affirmative, a session is established between the subscriber computing device from which the request originated and the CAP server. Because a subscriber identity may be shared by a household, multiple simultaneous sessions may be established with a CAP using a single subscriber identifier. In order to prevent abuse (e.g., where the subscriber identity is shared with non-household members), a CAP may impose a maximum number of sessions and/or streams associated with a particular subscriber identifier.

In an embodiment, the entitlement response may include an expiration time. In this embodiment, the CAP checks the status of the entitlement response. If the response has not expired, additional content requests that are consistent with the entitlement response may be granted by the CAP server without making an entitlement request to the entitlements server.

Returning to FIG. 3D, if the number of concurrent IP addresses is greater than or equal to the maximum allowed sessions (i.e., decision 572 is "Yes"), a decision to deny access is made and a "deny" response is returned (block 594) as indicated by reference "B" (see also, FIG. 3A). If the number of concurrent sessions is less than the maximum allowed sessions (i.e., decision 572 is "No"), a request is sent to an enterprise identity server to search for the subscriber account number using the subscriber identifier, and the results are returned to the entitlements server (block 582).

The entitlements server determines whether the subscriber account number was found (block 580). If the subscriber account number is not found (i.e., decision 572 is "No"), a decision to deny access is made and a "deny" response is returned (block 594) as indicated by reference "B" (see also, FIG. 3A). If the subscriber account number is found (i.e., decision 572 is "Yes"), subscription information for the subscriber is obtained and the program channels which the subscriber is authorized to receive are identified and reported to the entitlements server (block 582).

The entitlements server applies business policies to the subscription information to determine whether to allow the subscriber to access the requested content (block 584). As illustrated in FIG. 3D, the account status (block 586) and the account delinquency (block 588) are checked. However, this not meant to be a limitation. Other business policies may be applied to determine whether to allow the subscriber to access the requested content. By way of illustration and not as a limitation, the account may be checked for the age of the account, for the payment history on the account, and whether the account has been associated with undesirable conduct (abuse of equipment, abuse of bandwidth, for example).

If the account is determined to be inactive (i.e., decision 586 is "No"), a decision to deny access is made and a "deny" response is returned (block 594) as indicated by reference "B" (see also, FIG. 3A). If the subscriber account number is determined to be active (i.e., decision 586 is "Yes"), a decision is made whether the account is delinquent (block 588). If the account is determined to be delinquent (i.e., decision 588 is "Yes"), a decision to deny access is made and a "deny" response is returned (block 594) as indicated by reference "B" (see also, FIG. 3A). If the account is determined to be current (i.e., decision 588 is "No"), account and programmer content policies are applied to the subscription information to determine the channels of the CAP which the subscriber is entitled to received from the MVPD (block 590). By way of illustration and not by way of limitation, the premium and non-premium channels that are included in the subscription of the subscriber may be identified and the entitlements of the subscriber to content provided by the CAP may be determined.

The requested content is reviewed against the entitlements of the subscriber (block 592). If the requested content is not authorized (i.e., decision 592 is "No"), a decision to deny access is made and a "deny" response is returned (block 594) as indicated by reference "B" (see also, FIG. 3A). If the requested content is authorized (i.e., decision 592 is "Yes"), a decision to permit access is made and a "permit" response is returned (block 594) as indicated by reference "B" (see also, FIG. 3A).

In an embodiment, the IP address of the subscriber computing device is used to search a datastore for a related modem. A determination is made whether the related modem is found. If a related modem is found, the IP address is identified as "on-net." If a related modem is not found, the IP address is identified as "off-net." In an embodiment, the on-net/off-net status may be used to determine whether a subscriber is entitled to view particular content. In another embodiment, the on-net/off-net status may be incorporated into a business policy and applied to subscriber information to determine a subscriber's entitlement to view particular content (block 584). In yet another embodiment, the MVPD may offer improved quality-of-service (QoS) for content packets that delivered "on-net." The improved QoS may be a function of the service level of the subscriber or offered as a premium upgrade.

The entitlements process illustrated in FIGS. 3A-D anticipates that both the CAP and the identity provider server maintain identities for subscribers and that these identities may be linked. However, these figures and the description that follows are illustrative only and are not limiting. As described above, when the CAP does not maintain an identity for subscribers the subscriber may be authenticated by the identity provider server and the entitlements process is adapted accordingly.

In another embodiment, the MVPD proxies the CAP. In this embodiment, all content may be deemed "on-net" and a QoS attribute applied to delivery of that content.

The entitlement process illustrated in FIGS. 3A-D contemplates a subscriber ID that is not present on the subscriber computing device. In an embodiment, a customer entitlement identifier (subscriber identifier) is stored on the subscriber computing device and reflects the entitlements of a subscriber. By way of the illustration and not as a limitation, the subscriber identifier may be in the form of a cookie.

In an embodiment, the cookie may be to convey a subscriber identifier to the CAP server. The CAP server may then use the subscriber identifier from the cookie to search a CAP subscriber database to confirm that the subscriber is registered with the CAP.

In an embodiment, the entitlements system is updated and kept current according to a schedule. The following exemplary schedule is provided to illustrate this embodiment and is not meant as a limitation:

Service information related to video tiers (BST, CPST, Digital) is updated on a daily basis.

Service information related to all premium video services is updated on a daily basis.

Service information related to Subscription Video On Demand (SVOD) services is updated on a daily basis.

Service information related to transactional Video On Demand (VOD) services is updated on an immediate basis.

Figure 4:
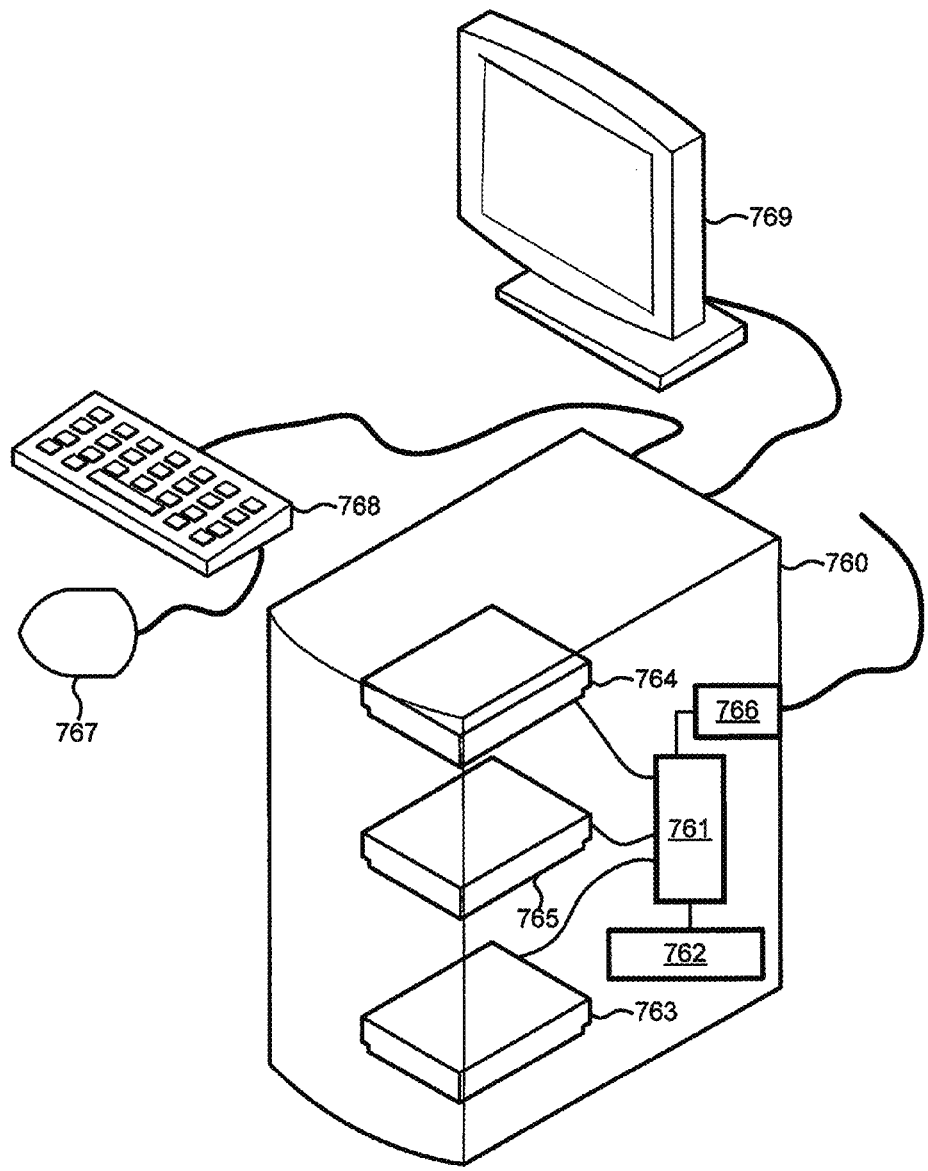
FIG. 4 is a block diagram illustrating functional components of a personal computer.

As previously described, the subscriber may interact with the various servers and network components using a variety of the computing devices, including a personal computer. By way of illustration, the functional components of a personal computer 760 are illustrated in FIG. 4. Such a personal computer 760 typically includes a processor 761 coupled to volatile memory 762 and a large capacity nonvolatile memory, such as a disk drive 763. The computer 760 may also include a floppy disc drive 764 and a compact disc (CD) drive 765 coupled to the processor 761. Typically the computer device 760 will also include a pointing device such as a mouse 767, a user input device such as a keyboard 768 and a display 769. The computer device 760 may also include a number of connector ports coupled to the processor 761 for establishing data connections or receiving external memory devices, such as a USB or FireWire® connector sockets or other network connection circuits 766 for coupling the processor 761 to a network. In a notebook configuration, the computer housing includes the pointing device 767, keyboard 768 and the display 769 as is well known in the computer arts.

While the capability of the subscriber computing device 208 (see, FIG. 2) has been disclosed with respect to a computer, those skilled in the art will also appreciate that the system can be embodied in a manner that utilizes mobile devices. For example, cell phones, PDA's and other mobile devices may perform some or all of the functions of subscriber computing device 208.

Figure 5:
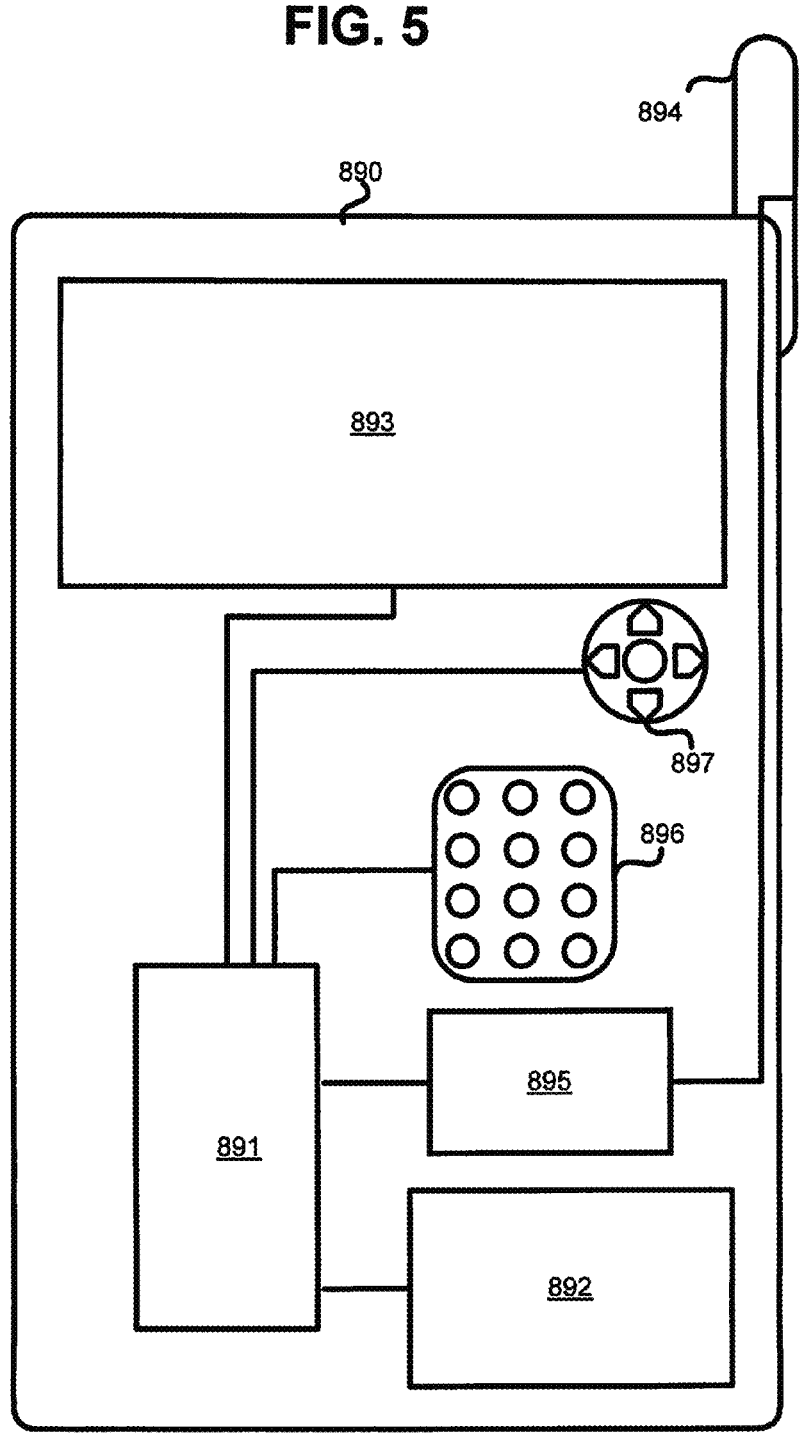
FIG. 5 is a block diagram illustrating functional components of a wireless device.

Typical mobile devices suitable for use with the various embodiments will have in common the components illustrated in FIG. 5. For example, the exemplary mobile device 890 may include a processor 891 coupled to internal memory 892, a display 893 and to a SIMM (not illustrated) or similar removable memory unit. Additionally, the mobile device 890 may have an antenna 894 for sending and receiving electromagnetic radiation that is connected to a wireless data link and/or cellular telephone transceiver 895 coupled to the processor 891. In some implementations, the transceiver 895 and portions of the processor 891 and memory 892 used for cellular telephone communications are collectively referred to as the air interface since it provides a data interface via a wireless data link. Mobile devices typically also include a key pad 896 or miniature keyboard and menu selection buttons or rocker switches 897 for receiving user inputs.

The processor 891 may be any programmable microprocessor, microcomputer or multiple processor chip or chips that can be configured by software instructions (applications) to perform a variety of functions, including the functions of the various embodiments described herein. In some mobile devices, multiple processors 891 may be provided, such as one processor dedicated to wireless communication functions and one processor dedicated to running other applications. Typically, software applications may be stored in the internal memory 892 before they are accessed and loaded into the processor 891. In some mobile devices, the processor 891 may include internal memory sufficient to store the application software instructions. The internal memory of the processor may include a secure memory (not illustrated) which is not directly accessible by users or applications and that is capable of recording MDINs and SIMM IDs as described in the various embodiments. As part of the processor, such a secure memory may not be replaced or accessed without damaging or replacing the processor. In some mobile devices, additional memory chips (e.g., a Secure Data (SD) card) may be plugged into the device 890 and coupled to the processor 891. In many mobile devices, the internal memory 892 may be a volatile or nonvolatile memory, such as flash memory, or a mixture of both. For the purposes of this description, a general reference to memory refers to all memory accessible by the processor 891, including internal memory 892, removable memory plugged into the mobile device, and memory within the processor 891 itself, including the secure memory.

Figure 6:
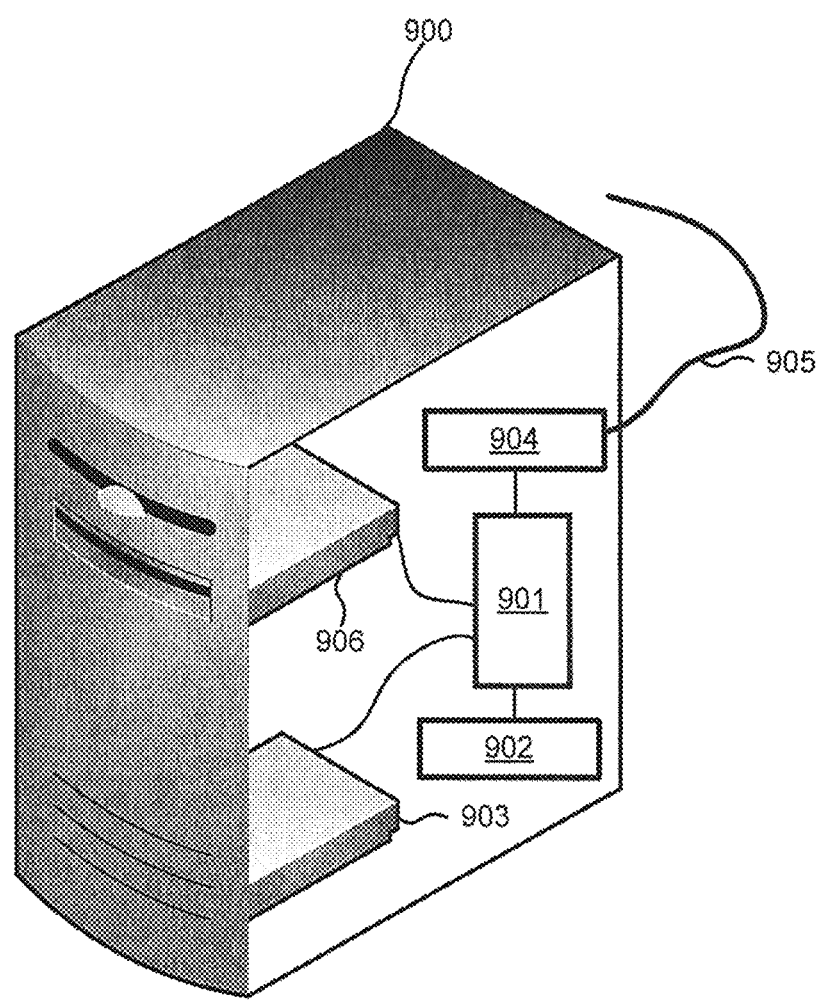
FIG. 6 is a block diagram illustrating functional components of a server.

A number of the aspects described above may also be implemented with any of a variety of remote server devices, such as the server 900 illustrated in FIG. 6. Such a server 900 typically includes a processor 901 coupled to volatile memory 902 and a large capacity nonvolatile memory, such as a disk drive 903. The server 900 may also include a floppy disk drive and/or a compact disc (CD) drive 906 coupled to the processor 901. The server 900 may also include a number of connector ports 904 coupled to the processor 901 for establishing data connections with network circuits 905.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for determining entitlement to receive content residing on a server via a network, the method comprising:
   receiving via a processor of a multi-channel video program distributor (MVPD) server a content access request message that includes an Internet Protocol (IP) address from a subscriber computing device;
   determining via the processor of the MVPD server and based on the IP address included in the received content access request message whether the subscriber computing device is connected to the network via an authorized network access device;
   providing a first content to the subscriber computing device in response to determining, based on the IP address included in the received content access message, that the subscriber computing device is not connected to the network via the authorized network access device, wherein providing the first content to the subscriber computing device comprises:
      sending no content to the subscriber computing device; or
      sending the requested content to the subscriber computing device in accordance with a second quality-of-service level that is lower than a first quality-of-service level;
   sending the received content access request message and a subscriber identifier from the MVPD server to an entitlements server in response to determining, based on the IP address included in the received content access message, that the subscriber computing device is connected to the network via the authorized network access device, the entitlements server using the subscriber identifier to determine a subscription level, the subscription level to determine subscriber entitlement to receive the requested content, and the subscriber entitlement to generate an authorization message;
   receiving the authorization message in the MVPD server in response to sending the content access request message and the subscriber identifier to the entitlements server; and
   determining via the processor of the MVPD server whether to provide the requested content to the subscriber computing device in accordance with the first quality-of-service level based on the received authorization message.

2. The method of claim 1, wherein the authorized network access device is a cable modem.

3. The method of claim 1, wherein the content is selected from the group consisting of video content, audio content, photographic content, text content, game content, and multimedia content.

4. The method of claim 1, wherein the subscriber computing device is selected from the group consisting of a desktop computer, a laptop computer, a mobile device, a PDA, and a cell phone.

5. The method of claim 1, wherein the network is a shared network selected from the group consisting of a shared cable network, a shared hybrid-fiber-coax network, a shared fiber network, a shared satellite network, and a shared IP network.

6. The method of claim 1, wherein using the subscriber identifier to determine the subscription level, the subscription level to determine the subscriber entitlement to receive the requested content, and the subscriber entitlement to generate the authorization message further comprises:
   identifying from the subscription level one or more channels that the subscriber computing device is entitled to receive from the MVPD server; and
   determining whether the entitlement to receive the one or more channels entitles the subscriber computing device to receive the requested content.

7. The method of claim 1, wherein the subscription level is selected from the group consisting of a list of subscribed channels, a service package descriptor indicative of a subscribed level of service, and a list of subscribed premium services.

8. The method of claim 1, further comprising denying the requested content in response to determining based on the IP address included in the received content access message that the subscriber computing device is not connected to the network via the authorized network access device.

9. The method of claim 1, wherein the network is selected from the group consisting of a wired network, a wireless network, a public switched network, a packet switched network, a hybrid-fiber coax network, a fiber network, and a satellite network.

10. A system for determining entitlement to receive content residing on a server via a network, the system comprising:
   a content server comprising a first processor; and
   an entitlements server comprising a second processor, wherein:
      the first processor is configured with software executable instructions to cause the content server to perform operations comprising:
         receiving a content access request message from a subscriber computing device that includes an Internet Protocol (IP) address;
         determining based on the IP address included in the received content access request message whether the subscriber computing device is connected to the network via an authorized network access device;
         providing a first content to the subscriber computing device in response to determining, based on the IP address included in the received content access message, that the subscriber computing device is not connected to the network via the authorized network access device, wherein providing the first content to the subscriber computing device comprises:
            sending no content to the subscriber computing device; or sending the requested content to the subscriber computing device in accordance with a second quality-of-service level that is lower than a first quality-of-service level;

sending the received content access request message and a subscriber identifier to the entitlements server in response to determining that the subscriber computing device is connected to the network via the authorized network access device;

the second processor is configured with software executable instructions to cause the entitlements server to perform operations comprising:

using the subscriber identifier to determine a subscription level;

using the subscription level to determine subscriber entitlement to receive the requested content;

using the subscriber entitlement to receive the requested content to generate an authorization message; and wherein the first processor is further configured with software executable instructions to cause the content server to perform operations comprising;

receiving the authorization message from the entitlements server;

determining whether to provide the requested content to the subscriber computing device in accordance with the first quality-of-service level based on the received authorization message.

11. The system of claim 10, wherein the authorized network access device is a cable modem.

12. The system of claim 10, wherein the content is selected from the group consisting of video content, audio content, photographic content, text content, game content, and multimedia content.

13. The system of claim 10, wherein the subscriber computing device is selected from the group consisting of a desktop computer, a laptop computer, a mobile device, a PDA, and a cell phone.

14. The system of claim 10, wherein the network is a shared network selected from the group consisting of a shared cable network, a shared hybrid-fiber-coax network, a shared fiber network, a shared satellite network, and a shared IP network.

15. The system of claim 10, wherein the second processor is configured with software executable instructions to cause the entitlements server to perform operations such that using the subscriber identifier to determine the subscription level and using the subscription level to determine the subscriber entitlement comprises:

identifying from the subscription level one or more channels that the subscriber computing device is entitled to receive from the MVPD server; and determining whether the entitlement to receive the one or more channels entitles the subscriber computing device to receive the requested content.

16. The system of claim 10, wherein the subscription level is selected from the group consisting of a list of subscribed channels, a service package descriptor indicative of a subscribed level of service, and a list of subscribed premium services.

17. The system of claim 10, wherein the first processor is configured with software executable instructions to cause the entitlements server to perform operations further comprising denying the request for the content in response to determining based on the IP address included in the received content access message that the subscriber computing device is not connected to the network via the authorized network access device.

18. The system of claim 10, wherein the network is selected from the group consisting of a wired network, a wireless network, a public switched network, a packet switched network, a hybrid-fiber coax network, a fiber network, and a satellite network.

* * * * *